G. H. CURTISS.
TRIPOD FLYING BOAT.
APPLICATION FILED JULY 1, 1916.
1,358,527.
Patented Nov. 9, 1920.
3 SHEETS—SHEET 3.
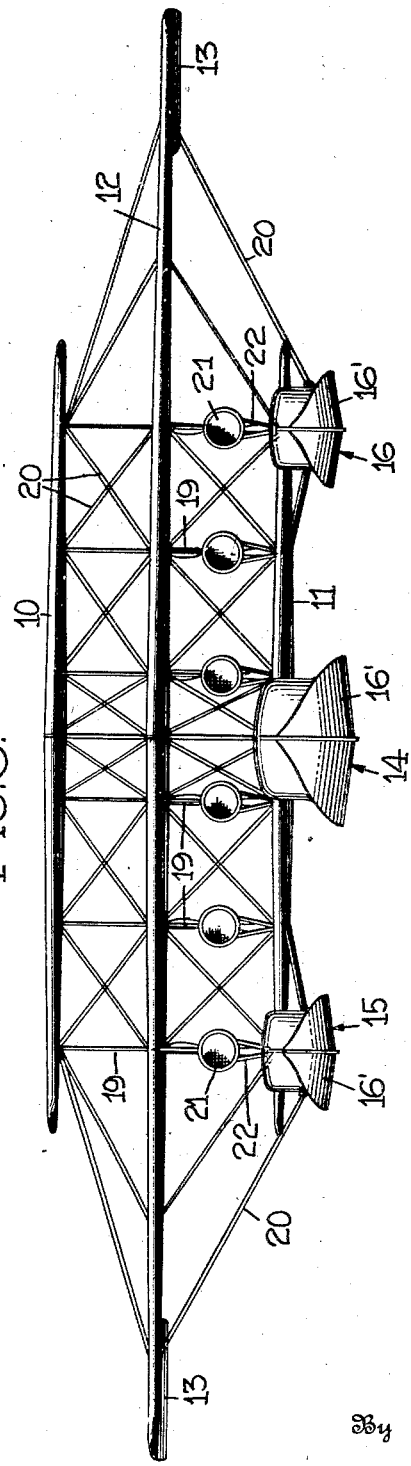
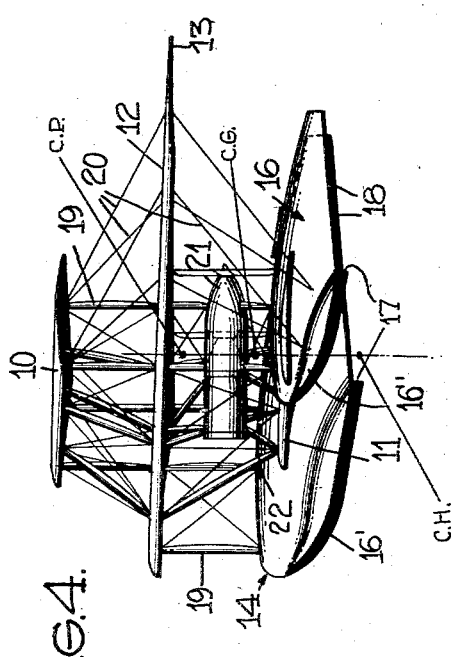
Inventor
GLENN H. CURTISS.
By
Attorney

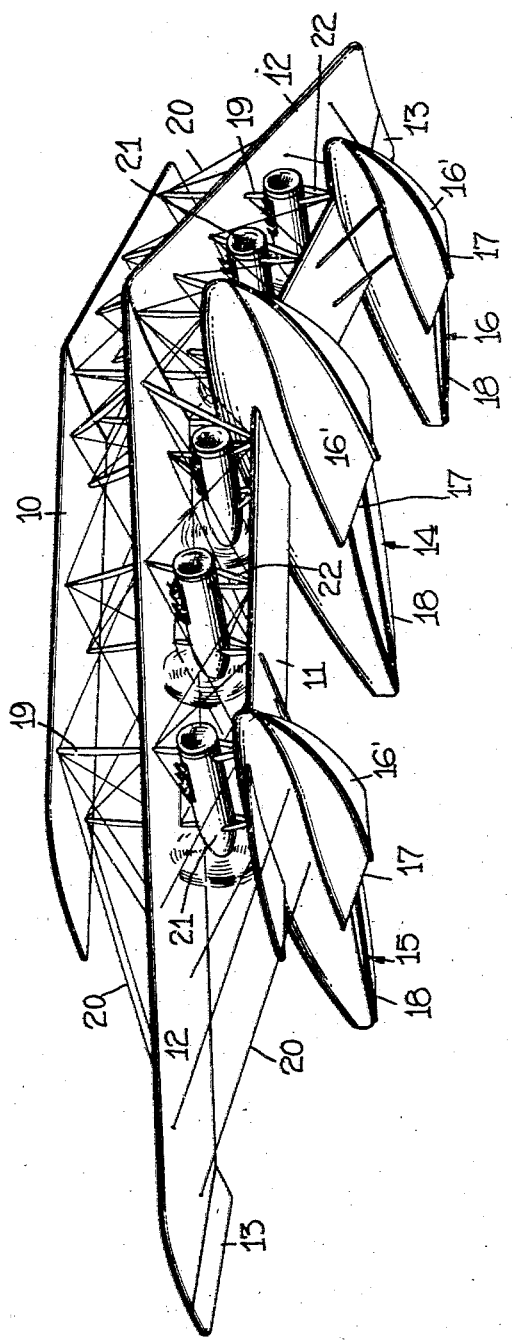

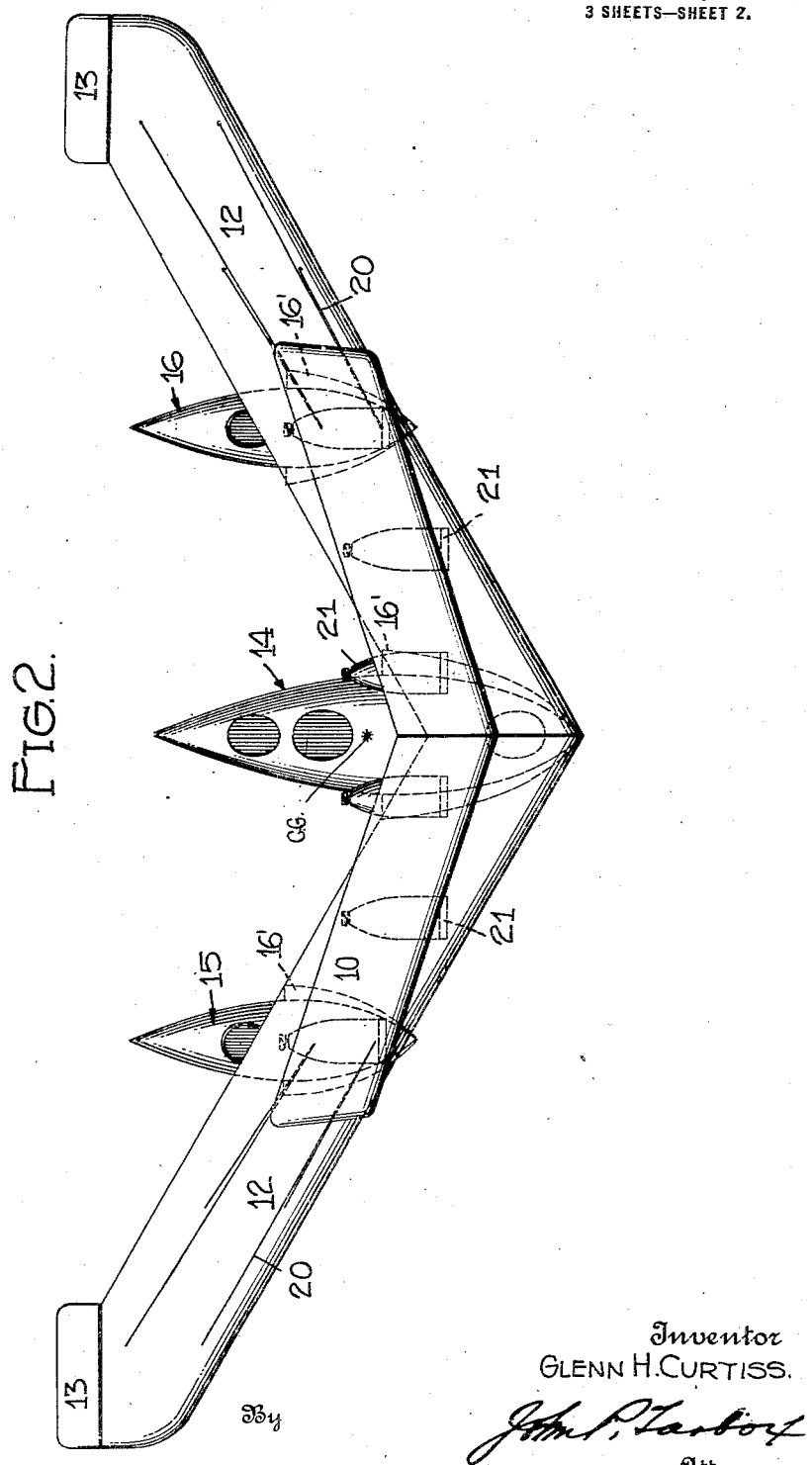

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

TRIPOD FLYING-BOAT.

1,358,527. Specification of Letters Patent. Patented Nov. 9, 1920.

Application filed July 1, 1916. Serial No. 107,162.

*To all whom it may concern:*

Be it known that I, GLENN H. CURTISS, a citizen of the United States, residing at Buffalo, in the county of Erie and State of New York, have invented certain new and useful Improvements in Tripod Flying-Boats, of which the following is a specification.

My invention relates to aircraft and has special reference to hydroaeroplanes designed for inherent stability in flight and while hydroplaning.

Generically, or in its broad aspect, the invention is an improvement upon the "Dunne" aeroplane described and claimed in Letters Patent 1,003,721, issued to J. W. Dunne, September 19, 1911. As therein pointed out, each of the main supporting surfaces is constructed as a rearwardly projecting rigid wing, the angle of incidence of which decreases from the center toward the tips and in some cases changes sign. Compensation is had for the decreased lifting power of the tips by shaping the wings so as to compress air between a positively inclined portion of the wing near the center and the negatively inclined portion in the region of the tip. The superposed supporting surfaces in the Dunne patent, however, have a corresponding angle of retreat, that is, the wings at opposite sides of the body of the craft extend rearwardly at an angle and in parallelism while the wings or supporting surfaces in the present invention have a different angle of retreat and unlike the wings in the mentioned patent have both an unequal aspect ratio and an unequal surface spread.

Seaplanes, hydroaeroplanes and flying boats generally, in so far as I am aware, rely solely upon a main flotation body and auxiliary floats or wing pontoons of little or no sustaining capacity or upon laterally spaced and alined flotation bodies of equal sustaining capacity for support while hydroplaning or at rest upon the surface of the water. In contradistinction to such an arrangement the present invention contemplates the utilization of three flotation bodies, each equipped with a stepped hydroplaning bottom. These bodies are symmetrically disposed (triangularly if viewed in plan) at opposite sides of the medial fore and aft axis of the craft, one principally in advance of the center of gravity and the remaining two principally aft thereof, each functioning as a main or primary sustaining medium and each bearing its proportionate share of the total aircraft load or weight. By the use of swept back wings or supporting surfaces, the triangular arrangement of the flotation bodies may be readily obtained since the aft flotation bodies can be conveniently located at the respective wing or surface terminals and the forward or intermediate body at the apex end of the surface. Both lateral and longitudinal stability while hydroplaning are thus positively maintained and the objectionable "dipping" and "pitching" heretofore in evidence, completely avoided. Obviously, this arrangement of floats may be used in connection with other forms of wings than the Dunne.

I further contemplate a novel and symmetrical plural propelling power plant arrangement which I will hereinafter more particularly describe.

In the accompanying drawings wherein like characters of reference designate like or corresponding parts throughout the several views:

Figure 1 is a perspective view of my improved hydrotriplane;

Fig. 2 is a top plan vew;

Fig. 3 is a front end elevation, and

Fig. 4 is a side elevation.

While I have illustrated and shall hereinafter describe my improved hydroaeroplane as equipped with three triangularly arranged flotation bodies, it is to be understood at the outset that the number and relative arrangement of said bodies may be varied somewhat without departing from the basic idea: to wit, the utilization of flotation bodies respectively principally ahead of and principally aft of the center of gravity of the machine, each body sustaining a substantial portion of the total load.

For illustration I have selected the embodiment of the invention which I consider preferred. The supporting surfaces, three in number, are arranged in superposed relation for symmetrical distribution of the surface spread at opposite sides of the longitudinal axis of the craft. In the original "Dunne" idea, a biplane having directly superposed supporting surfaces is shown, the surfaces both extending rearwardly in parallelism and at a uniform angle of retreat. The present invention, although generally similar in so far as the individual wing formation is concerned, is somewhat and in fact materially different as regards the relative wing arrangement.

It is the modern tendency in aircraft construction to increase greatly the size, speed, range and carrying capacity of aeroplanes designed for military use and to construct such machines along multiplane lines in view of the effectual wing trussing obtainable and the greatly increased surface spread.

Each of the wings of my improved hydrotriplane is constructed to extend rearwardly at an angle, the opposed wings 10 of the upper supporting surface and the correspondingly disposed wings 11 of the lower supporting surface being alike in size, shape and form and arranged for rearward angular extension in parallelism and at a lesser angle of retreat than the intermediate opposed wings 12 constituting the intermediate plane or supporting surface of the machine. The surface spread of the intermediate supporting surface or plane is much larger than the surface spread of the upper plane 10 and the lower plane 11 to thus dispose the wing tips of said intermediate plane laterally and rearwardly beyond the wing tips of the coacting planes. Ailerons 13 are located at the rear outer terminals of the intermediate plane to compensate for directional changes incident to flight. If it is desired to incline the front of the machine upward, the ailerons should be inclined upward so as to receive air pressure upon the upper surface and so force the rear of the machine down. To incline the front of the machine downward, the ailerons should be lowered so as to receive air pressure on their under sides and so lift the rear of the machine. In order to turn to the right, the right hand aileron should be raised and the left hand aileron lowered; and in order to turn to the left, the left hand aileron should be raised and the right hand aileron lowered. Both ailerons are mounted for movement on axes extending transversely of the line of flight and each equipped with suitable control mechanism (not shown).

As illustrated to advantage in Fig. 2 of the drawings, the intermediate supporting surface 12 is located to extend forwardly beyond the leading edge of the upper supporting surface 10 and the lower supporting surface 11 to enter the air slightly in advance of the said surfaces 10 and 11—otherwise there would be a tendency to "blanket" the intermediate plane. The aspect ratio of the several planes is also at variance as is also the angle of retreat. By giving to the intermediate plane a deeper chord line than the chord of the upper plane 10 and the lower plane 11, a greater lift is obtained. The angle of incidence of each wing decreases from the center where it is positively inclined to the region of the tips where it is negatively inclined. This latter feature, as above pointed out, is characteristic of the original Dunne machine. Moreover, the peculiar wing arrangement will locate the center of pressure a little farther ahead.

Unlike all machines heretofore proposed for aerial flight, three flotation bodies of substantial sustaining capacity are provided. As indicated in Fig. 1, the main flotation body 14 is disposed principally ahead of the center of gravity of the machine and in the vertical plane of the longitudinal axis preferably at the apex end of the lower supporting surface 11. The two remaining flotation bodies, designated respectively 15 and 16, (and each in its entirety,) are located respectively at opposite sides of the longitudinal axis and principally aft of the center of gravity of the machine to induce both longitudinal and lateral stability while hydroplaning or at rest upon the surface of the water. A star indicated upon Fig. 2 denotes the center of gravity. The flotation bodies 15 and 16 although somewhat smaller than the center flotation body 14, each sustain a substantial portion of the total load and each with the center flotation body hydroplane continuously before the machine rises from the surface of the water. Each flotation body is of passenger-carrying capacity.

The formation of the wings as above pointed out is such as to provide for the arrangement of the flotation bodies in triangular relation when viewed in plan, each flotation body being located at the angle of an isosceles triangle to provide in effect a "tripod" support.

Each flotation body is shaped in streamline form and equipped with a forward hydroplaning surface 16', a rearwardly facing step 17 terminating the hydroplaning surface and a flat upwardly and rearwardly extending tail portion 18. This arrangement under ordinary conditions, will permit the several flotation bodies to break from the surface of the water simultaneously, and without undue resistance. To rise from the surface of rough water it is customary to first decrease the angle of incidence of the supporting planes by elevating the rear end of the machine. This action will cause the machine to travel forward in a true horizontal line, the several flotation bodies collectively sustaining the weight of the machine. After attaining maximum speed, the angle of incidence is increased and the forward flotation body thus caused first to "break" from the water, the after flotation bodies immediately following. Furthermore, in traveling on rough water, the machine, if pitched to one side, will ride over onto two of the floats, (and not one as heretofore), a line drawn between any two floats affording an axis of oscillation.

Struts 19 interconnect the superposed wings or planes and accordingly brace the machine transversely. The inner or center struts diagonally connect the supporting surfaces since, as pointed out, the intermediate surface is extended forwardly beyond the lower surface 11 and the upper surface 10. Wires 20 not only transversely and longitudinally brace the wings or planes but, as indicated in Fig. 1, brace the rear flotation bodies 15 and 16.

Aircraft of the triplane type must be high powered in order to secure wide range and speed. In the present instance, the craft is equipped with six individual propelling power plants, each of which is designated in its entirety by the numeral 21. For the proper distribution of weight, the propelling power plants are located preferably three at each side of the longitudinal axis of the machine and intermediate the lower supporting surface 11 and the intermediate supporting surface 12. V-arranged struts 22 brace each propelling power plant to the lower supporting surface 11 in a true vertical plane. Each propelling power plant is inclosed in a streamline housing to decrease the head resistance and equipped with a pusher propeller of a size to operate intermediate said lower and intermediate planes.

Although not essential, it is desirable that the propelling power plants be located symmetrically as regards the central longitudinal axis of the machine, two plants directly over the center flotation body, one each over the rearwardly or laterally disposed flotation bodies, and one intermediate each the outer plants and the plants adjacent the central axis of the machine. Such an arrangement will distribute the weight of the machine between the several flotation bodies, and also uniformly over the aeroplane cell structure.

The power unit arrangement disclosed is further advantageous in that the weight of the plants collectively is to a certain extent distributed equally fore and aft of the center of gravity of the machine. The total weight of each outermost power unit is borne entirely by the flotation body arranged directly therebeneath as is also one-half the total weight of each intermediate power unit. The total weight of the remaining half of each intermediate power unit and the total weight of each innermost power unit is borne by the main flotation body. In brief, the two end or aft flotation bodies sustain approximately one-half the total load while the center flotation body sustains the remaining half.

While not essential, it is preferred that each auxiliary flotation body, as well as the main flotation body, be provided with a cockpit and interior quarters for passengers or crew.

Although I have described more or less precise forms and details of construction, I do not intend to be understood as limiting myself thereto as I contemplate changes in form, the proportion of parts, and the substitution of equivalents as circumstances may suggest or render expedient without departing from the spirit of the invention as claimed.

I claim—

1. In an airplane, the combination of supporting surfaces, a central flotation body, end flotation bodies spaced laterally out from the central flotation body, the location of the end flotation bodies being such that they lie nearer the outer ends of the lower supporting surface than to the longitudinal vertical plane of the fore and aft axis of the craft, and a plural number of propelling power plants so relatively arranged that the weight of one power plant is borne directly by each flotation body.

2. In an airplane, the combination of superposed supporting surfaces, a central flotation body, end flotation bodies spaced laterally out from the central flotation body, the location of the end flotation bodies being such that they lie nearer the outer ends of the lower supporting surface than to the longitudinal vertical plane of the fore and aft axis of the craft, and a plural number of propelling power plants mounted between the superposed supporting surfaces in a manner such that the weight mass of one power plant is borne directly by each flotation body.

3. In an airplane, the combination of supporting surfaces, a central flotation body, end flotation bodies spaced laterally out from the central flotation body, the total sustaining capacity of any one of said flotation bodies being insufficient to support unaided the total weight of the machine, the location of the end flotation bodies being such that they lie nearer the outer ends of the lower supporting surface than to the longitudinal vertical plane of the fore and aft axis of the craft, and a plural number of propelling power plants so relatively arranged that the weight mass of one power plant is borne directly by each flotation body.

4. In an airplane, the combination of supporting surfaces, a central flotation body, end flotation bodies spaced laterally out from the central flotation body, the location of the end flotation bodies being such that they lie nearer the outer ends of the lower supporting surface than to the longitudinal vertical plane of the fore and aft axis of the craft, and a cockpit formed in each flotation body for occupancy by one or more of the flying crew, the relative arrangement of the cockpits being such that the occupants of the cockpits formed in the end flotation bodies have an unobstructed range of vision rearwardly of the machine while the occupant or occupants of the cockpit of the central flotation body have an unobstructed range of vision forwardly of the machine.

5. In an airplane, the combination of supporting surfaces, a central flotation body having a cockpit for occupancy by one or more of the flying crew, the occupant or occupants of the cockpit formed in the central flotation body having an unobstructed range of vision ahead of the machine, end flotation bodies spaced laterally out from the central flotation body, the location of the end flotation bodies being such that they lie nearer the outer ends of the lower supporting surface than to the longitudinal plane of the fore and aft axis of the craft, the end flotation bodies being also provided with cockpits for occupancy by one or more of the flying crew, the arrangement of the cockpits in the end flotation bodies being such that the occupant or occupants thereof have an unobstructed range of vision rearwardly of the machine, and a plural number of propelling power plants so relatively arranged that the weight mass of at least one power plant is borne directly by each flotation body.

6. In an airplane, the combination of supporting surfaces, a central flotation body, end flotation bodies spaced laterally out from the central flotation body, the location of the end flotation bodies being such that they lie nearer the outer ends of the lower supporting surface than to the longitudinal vertical plane of the fore and aft axis of the craft, the end flotation bodies being provided each with a cockpit for occupancy by one or more of the flying crew, and a plural number of propelling power plants so relatively arranged that the weight mass thereof is borne collectively by the total number of flotation bodies although principally by the flotation body located centrally of the machine.

7. In an airplane, the combination of superposed supporting surfaces, a central flotation body, end flotation bodies spaced laterally out from the central flotation body, the location of the end flotation bodies being such that they lie nearer the outer ends of the lower supporting surface than to the longitudinal vertical plane of the fore and aft axis of the craft, and a plural number of propelling power plants located intermediate the superposed supporting surfaces, the outermost power plants being situated directly above the end flotation bodies while the remaining number of power plants are arranged symmetrically as regards said axis to distribute the weight mass thereof upon the flotation bodies collectively although principally upon the flotation body located centrally of the machine.

8. In an airplane, the combination of supporting surfaces, a central flotation body, end flotation bodies spaced laterally out from the central flotation body, the arrangement of the several flotation bodies being such that the lower supporting surface is interrupted for portions of its length at each flotation body, and propelling power plants for the craft symmetrically arranged about the central flotation body, the weight mass of the total number of propelling power plants being apportioned unequally and in such manner that the central flotation body sustains the bulk of the weight.

9. In a hydro-aircraft, supporting surfaces, a center flotation body of a size insufficient to support unaided the total weight of the craft, and additional floats mounted respectively nearer the wing tips than the center line, the size of the end floats being such that their sustaining capacity combined substantially equals the sustaining capacity of the principal center float.

10. In an aircraft, supporting surfaces comprising swept-back wings, floats arranged beneath the wings respectively at the tips and apex thereof, and power plants mounted above the end floats and symmetrically as regards the center float, the arrangement of both the floats and power plants being such that the center float and one or more of the power plants lie principally ahead of the center of gravity and the end floats and one or more of the power plants principally aft thereof.

11. In an airplane, the combination of supporting surfaces, a central flotation body, end flotation bodies spaced laterally out from the central flotation body, the location of the end flotation bodies being such that they lie nearer to the outer ends of the lower supporting surfaces than to the longitudinal vertical plane of the fore and aft axis of the craft, and a plural number of propelling power plants mounted between the supporting surfaces, the outermost propelling power plants on opposite sides of the central flotation body being situated substantially directly above the end flotation bodies.

12. In an aircraft, the combination of supporting surfaces, a principal flotation body, additional flotation bodies sufficiently laterally removed from the principal flotation body to prevent the machine from tipping laterally while hydroplaning or at rest upon the surface of the water, a cockpit formed in each flotation body for occupancy by one or more of the flying crew and a plural number of propelling power plants so relatively arranged that the weight mass thereof is borne collectively by the total number of flotation bodies under all water operating conditions, the preponderance of weight, however, being borne by the principal flotation body which is somewhat larger than the flotation bodies laterally spaced therefrom.

In testimony whereof I affix my signature.

GLENN H. CURTISS.